June 22, 1965  W. PICKRIL  3,189,976
ADJUSTABLE CUTTING TOOLHOLDER
Filed Dec. 27, 1963  2 Sheets-Sheet 1

Inventor:
William Pickril,
by [signature]
His Attorney.

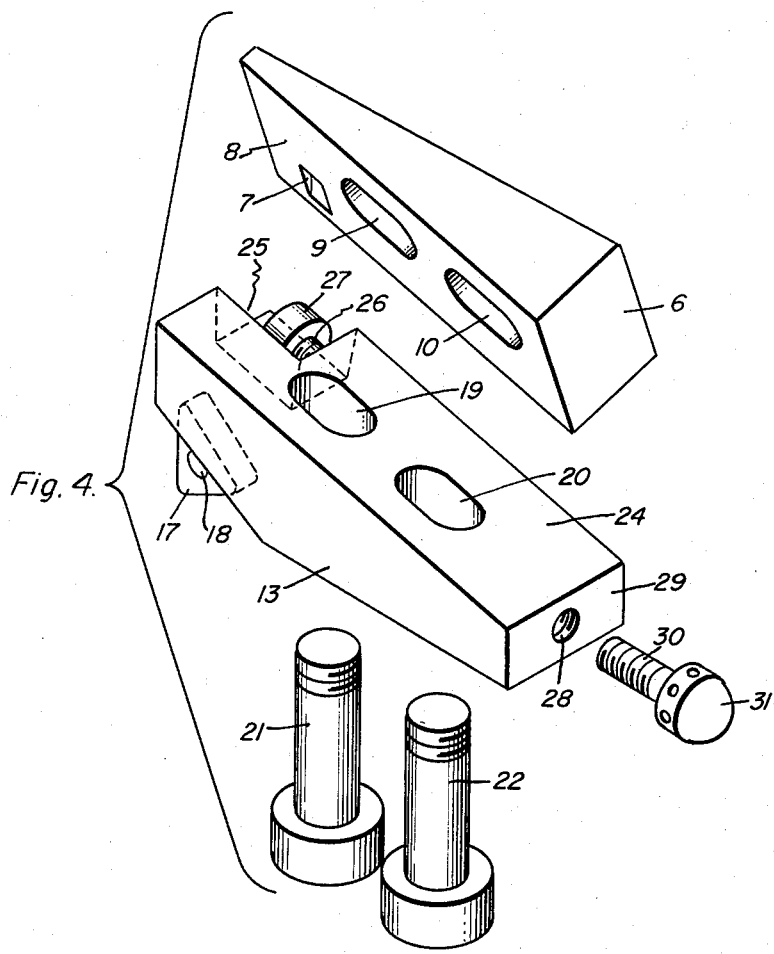

United States Patent Office 3,189,976
Patented June 22, 1965

3,189,976
ADJUSTABLE CUTTING TOOLHOLDER
William Pickril, Berkley, Mich., assignor to General
Electric Company, a corporation of New York
Filed Dec. 27, 1963, Ser. No. 333,958
1 Claim. (Cl. 29—96)

This invention relates to cartridges for adjustably mounting cutter bits on toolholders.

Cutting tools, such as boring tools, are often used for the accurate machining of work pieces and, consequently, it is of prime importance that cutter bits be accurately positioned on the toolholders. Furthermore, because of the deterioration of cutter bit cutting edges, it is important for purposes of economy to employ disposable cutter bits which can be easily replaced and realigned on the toolholders.

The deterioration of the cutting edges and the extent to which dimensional tolerance varies in both the manufacturing of disposable cutter bits and in the utilization of these bits makes it desirable to be able to adjust the position of the cutter bits relative to the toolholders on which they are mounted without having to remove the cartridge from the toolholder and without disengaging, partially or entirely, the cutter bit from its support on the toolholder.

Accordingly, it is one object of the present invention to provide an inexpensive, adjustable toolholder cartridge which is capable of extremely fine and precise adjustment without removal of the cartridge from the toolholder.

It is another object of the present invention to provide a toolholder cartridge which is adjustable both longitudinally and transversely with respect to the toolholder on which it is mounted and which always provides full support for the cutter bit regardless of the position to which it is adjusted.

It is a further object of this invention to provide an adjustable toolholder cartridge constructed so as to use standard disposable cutter bits.

Further objects and attendant advantages of this invention will become better understood from the following description.

The adjustable cartridge of the invention comprises a pair of complementary members having oppositely tapered abutting surfaces. One of the complementary members is adapted to hold a cutter bit by conventional holding means. Means are provided for adjusting one of the tapered members relative to the other along the tapered surfaces. As one of the tapered members is moved relative to the other, the cutter bit is displaced, and may thereby be adjustably positioned, transversely to the direction of such movement. Means may also be provided for longitudinally moving both of the tapered members together and thus displacing and adjusting the cutter bit in the direction of such movement. Means are also provided for retaining the members in the adjusted position.

The invention will be better understood from the following description taken in connection with the accompanying drawings in which:

FIGURE 4 is an exploded perspective view of the adjustable cartridge of FIGURE 1.

Figure 1:
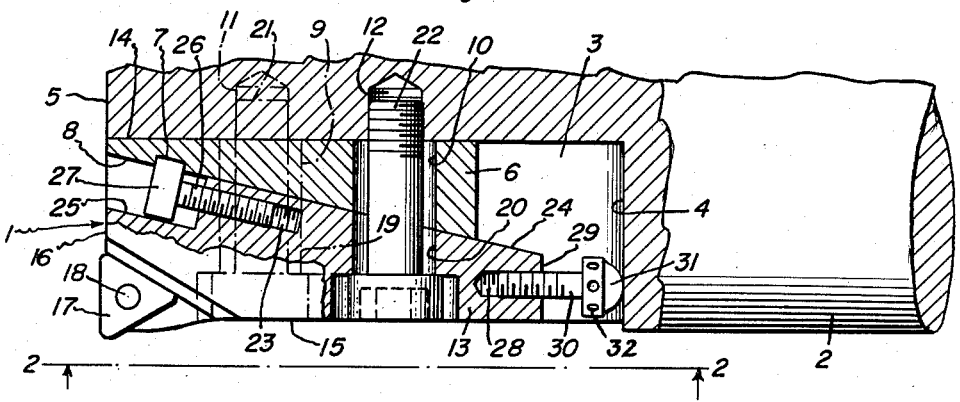
FIGURE 1 is a sectional view of an adjustable cartridge mounted in a boring bar illustrating one embodiment of the invention.

With reference to the drawings, an adjustable cartridge 1 is mounted on a toolholder such as a boring bar 2. The boring bar is provided with a groove 3 extending longitudinally therein having an end wall 4 spaced from one end 5 of the boring bar. A first member or gib 6 is slidably mounted within the groove 3 and is tapered longitudinally with respect to the boring bar 2. A recess or transverse slot 7 is provided in the tapered face 8 of the gib 6, the slot being disposed off center longitudinally in the gib. A pair of bolt holes 9 and 10 extend through the gib 6, as may be seen in FIGURES 1 and 4. Holes 9 and 10 are longitudinally elongated so as to permit longitudinal translational motion of the gib 6 with respect to bolts passing through the holes 9 and 10. A pair of corresponding internally threaded bores 11 and 12 are provided in the boring bar, the bores 11 and 12 being circular and properly sized to receive mounting bolts screwed therein.

A second complementary member, cutter bit holder 13, is slidably mounted on the gib 6 within the groove 3. The holder 13 is tapered at the same slope as the gib, the holder being tapered oppositely to the taper of the gib such that when the holder abuts the gib, two complementary members form a boring bar cartridge 1 having parallel faces, i.e., the surface 14 of the gib is parallel to the surface 15 of the cutter bit holder 13. A portion of the surface 15 adjacent the front end wall 16 of the cutter bit holder is cut away to receive a standard disposable cutter bit 17 at an extremity of the holder, the cutter bit being held by any known holding means such as bolt 18.

A pair of bolt holes 19 and 20 is provided through the cutter bit holder 13 and is generally aligned with the gib bolt holes 9 and 10 and the bores 11 and 12 provided in the boring bar 2, thus forming a pair of continuous bolt-receiving channels through the cutter bit holder 13, gib 6 and into the boring bar 2. The cutter bit holder bolt holes are longitudinally elongated to permit longitudinal adjustment of the cutter bit holder 13 parallel to the boring bar axis. Bolts 21 and 22 extend through the bolt holes retaining the cutter bit holder 13 and gib 6 in the groove 3 of the boring bar 2 during adjustment of these members and fixedly mounting these members on the boring bar after the adjustment has been completed.

Figure 2:
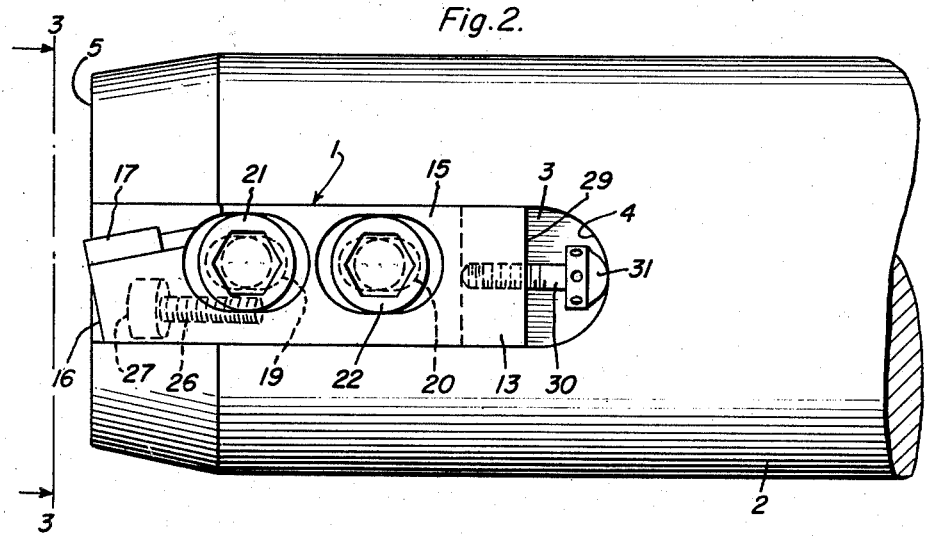
FIGURE 2 is a side view taken along lines 2—2 of FIGURE 1.
Figure 3:
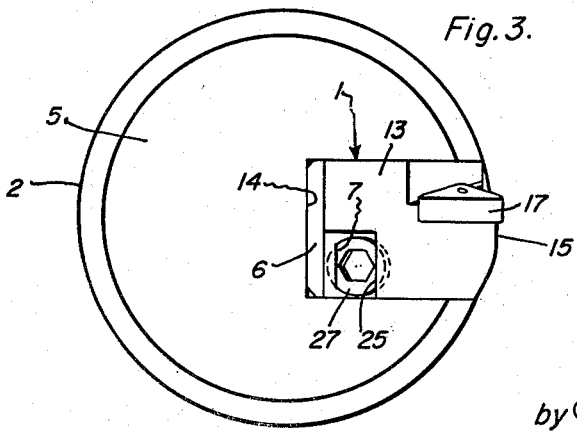
FIGURE 3 is an end view taken along the lines 3—3 of FIGURE 2.

To provide adjustment of the cutter bit 17 in a transverse direction, an internally threaded longitudinal bore 23 is provided through the front end wall 16 of the cutter bit holder 13. The bore extends longitudinally partially through the cutter bit holder 13 parallel to but spaced from the tapered face 24 thereof. A recess 25 is provided in the tapered face 24 of the cutter bit holder 13 to provide a receiving channel for an adjusting screw as described below. The recess 25 is located opposite the slot 7 in tapered face 8 of the gib 6 and extends inwardly from the front end 16 of the cutter bit holder 13. The bore 23 and recess 25 are, of course, located so as not to intersect the bolt holes 19 and 20 as may best be seen in FIGURES 2 and 4.

An externally threaded adjusting screw 26 having an enlarged section or head 27 is engagingly received by the bore 23 in such a manner that a portion of the head 27 is rotatably received by the slot 7 in the gib 6 (see FIGURE 1). Rotation of screw 26 causes longitudinal motion of the gib 6 relative to the cutter bit holder 13 and the boring bar 2. Because of the complemental and opposed tapered relationship of the gib 6 and the cutter bit holder 13, this results in the holder moving transversely to the boring bar axis, thus varying the displacement of the cutter bit 17 along a radius of the boring bar 2. By providing a fine, accurate pitch on the screw 26 and in the bore 23, accurate micrometric radial adjustment of the cutter bit 17 can be achieved. Since the recess 25 extends through the front end 16 of the cutter bit holder 13, transverse adjusment of the cutter bit 17 can be easily made from the front of the boring bar.

In order to achieve longitudinal adjustment of the cutter bit 17, a second longitudinal internally threaded bore 28 is provided through the rear end wall 29 of the cutter bit holder 13. An externally threaded adjusting screw 30 is received by the bore 28. An enlarged head 31 is provided on the end of the screw 30 and a plurality of openings 32 are circumferentially spaced around the screw head 31. The openings 32 are adapted to receive a tool for effecting rotation of the screw 30. The end wall 29 of the cutter bit holder 13 through which the bore 28 extends is received within the boring bar groove 3 and is adjacent the end wall 4 of the groove. The screw 30 is received within the bore 28 in such a manner that the screw head 31 abuts the end wall 4 of the groove. Therefore, counterclockwise rotation of the screw 30 forces the cutter bit holder 13 to move longitudinally away from the end wall 4. The gib 6 is also caused to move longitudinally with respect to the boring bar 2 as a unit with the holder 13 because of the coupling arrangement achieved through the interrelationship of the slot 7 in the gib 6, the first-mentioned adjusting screw 26 and the bore 23 in the cutter bit holder 13. As with the transverse adjusting means described above, accurate longitudinal adjustment can be easily attained by providing a fine, accurate pitch on the adjusting screw 30 and the co-operating bore 28.

When either transverse or longitudinal adjustment of the cutter bit 17 is desired, mounting screws 21 and 22 are partially retracted, thus freeing the gib 6 and cutter bit holder 13 for proper longitudinal movement. After the desired adjustment of the cutter bit has been completed, the mounting screws 21 and 22 are tightened, thus fixedly holding the adjustable boring bar cartridge 1 on the boring bar 2.

With the adjustable toolholder cartridge described above, extremely accurate variation in displacement of the cutter bit, transversely and longitudinally, can be achieved without having to remove the cartridge from the toolholder. Moreover, the cutter bit and the cutter bit holder always engage a full supporting surface, before and after adjustment.

What I claim as new and desire to secure by Letters Patent of the United States is:

A cutting tool comprising
a toolholder having a longitudinal groove provided at one end thereof to receive a cartridge, and an adjustable cartridge mounted therein, said adjustable cartridge comprising
first and second complementary members having oppositely tapered surfaces, one of said members being adapted to hold a cutter bit at one extremity thereof,
first adjusting means threadably engaged with one of said members and coupled in a fixed position with said other member for effecting longitudinal movement of one of said members relative to the other of said members along said tapered abutting surfaces to effect transverse movement of the other of said members,
second adjusting means threadably engaged with one of said members and abutting a portion of the toolholder in which the cartridge is mounted to effect longitudinal movement of said first and second members,
said first and second adjusting means being accessible while the cartridge is mounted in the toolholder and providing fine adjustment of said cutter bit in both a transverse and longitudinal direction by threadable adjustment of said first and second adjustment means, and
holding means for retaining said first and second members in adjusted position on said toolholder.

References Cited by the Examiner

UNITED STATES PATENTS

| | | | |
|---|---|---|---|
| 2,382,911 | 8/45 | Pringle | 29—96 |
| 2,900,704 | 8/59 | Sweet | 29—96 |
| 2,946,245 | 7/60 | Yogus | 29—96 X |
| 2,998,737 | 9/61 | Yogus. | |
| 3,102,441 | 9/63 | Milewski. | |
| 3,121,939 | 2/64 | Williams | 29—96 |
| 3,129,615 | 4/64 | Lombardo | 77—58 |
| 3,152,493 | 10/64 | Sullivan | 77—58 |

WILLIAM W. DYER, JR., *Primary Examiner.*